UNITED STATES PATENT OFFICE 2,642,770

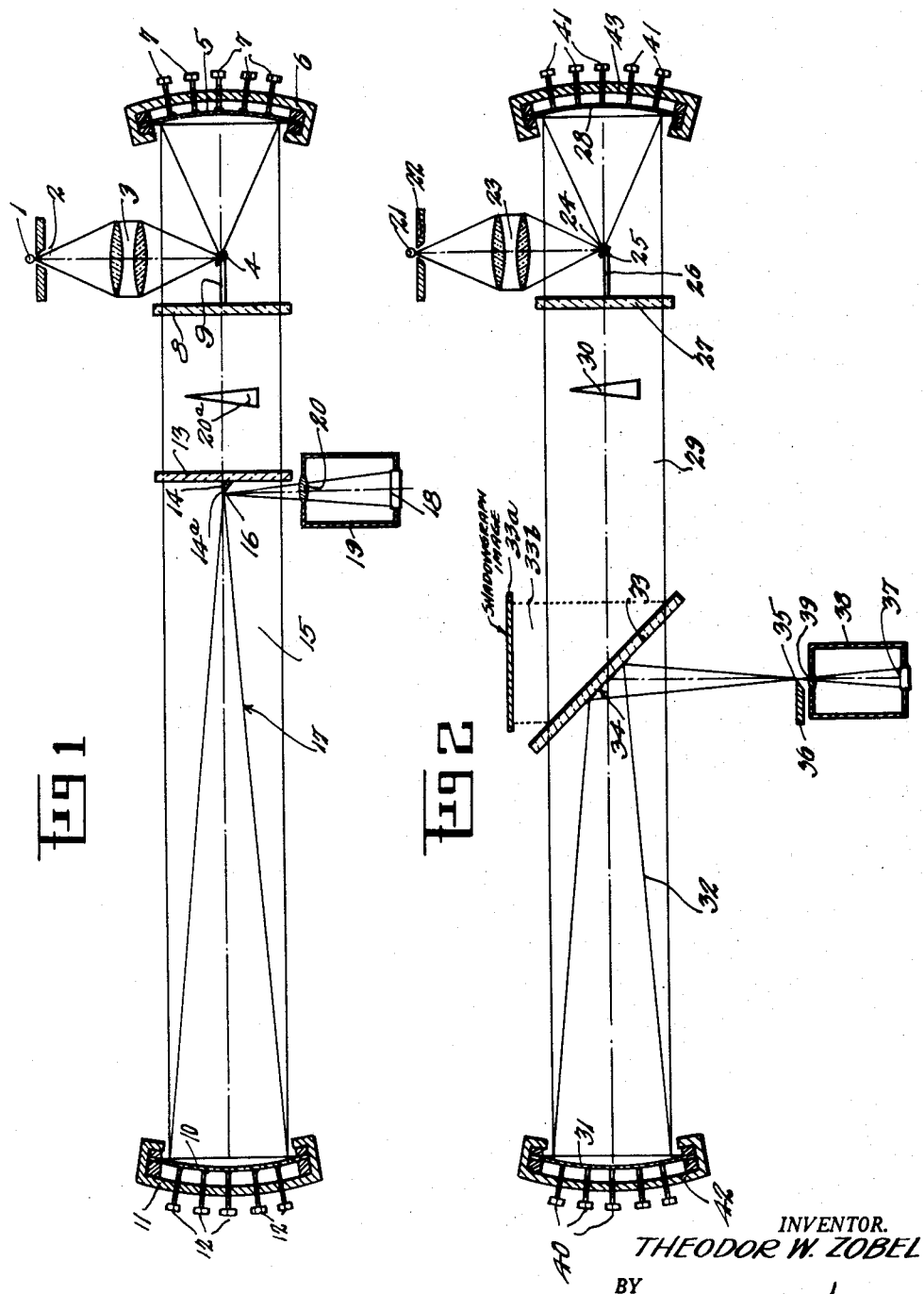

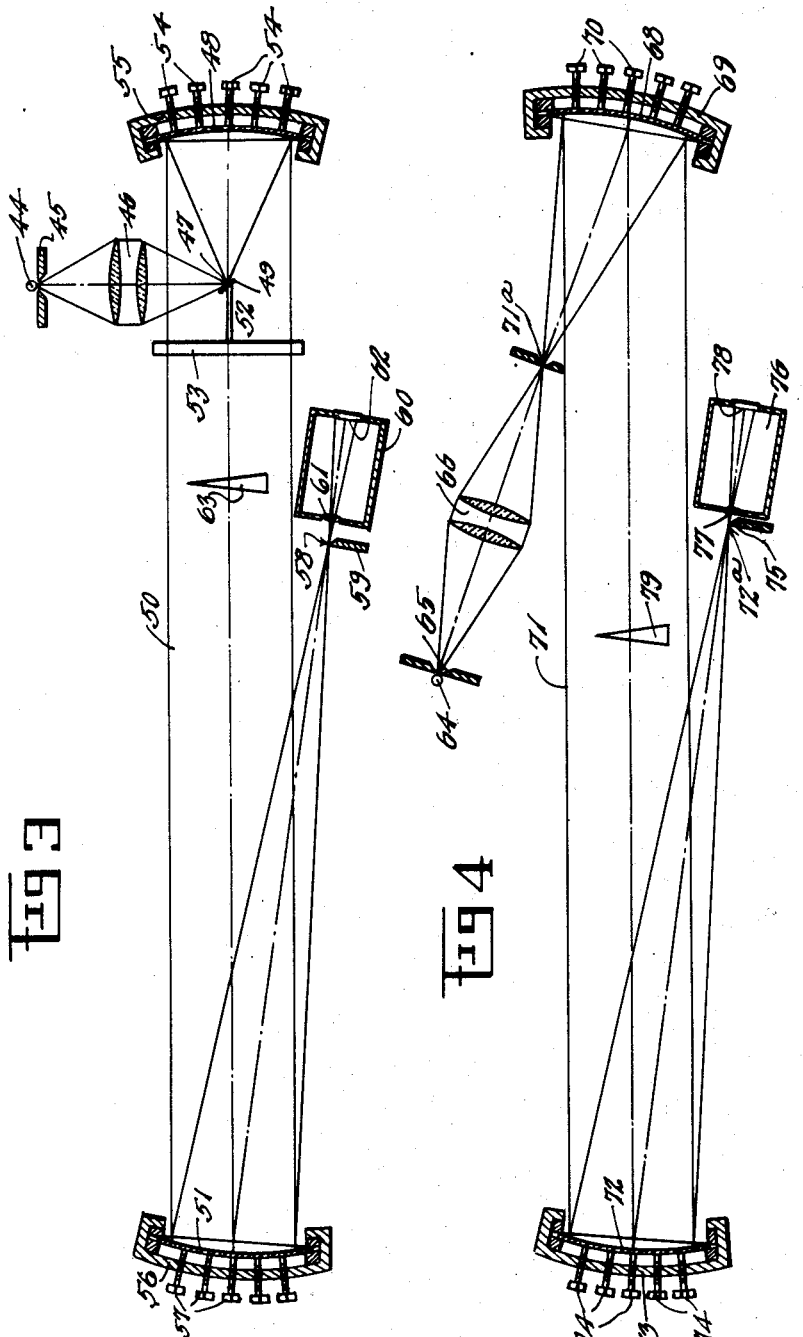

SCHLIEREN APPARATUS OF IMPROVED OPTICAL QUALITY

Theodor W. Zobel, Braunschweig, Germany, assignor to the United States of America as represented by the Secretary of the United States Air Force Application July 25, 1950, Serial No. 175,843

5 Claims. (Cl. 88—14)

(Granted under Title 35, U. S. Code (1952), sec. 266)

The invention described herein may be manufactured and used by or for the Government for governmental purposes without payment to me of any royalty thereon.

This invention relates to improvements for obtaining greater optical quality in Schlieren apparatus.

In many different fields the Schlieren process is very often applied at the present time as a very useful and simple process to obtain qualitative data. It is used, for example, to find "Schlieren" and their form in gases, to investigate solid and transparent bodies because of their optical qualities and purity of material used, to investigate plane parallel glass plates for non-parallelism and minute defects in the surface contours or wedge angles, to determine the refraction index of small glass pieces, to investigate density changes in gases and liquids caused by temperatures and velocities, changing of concentrations, pressure waves in liquids and so forth.

One of the important and principle uses of the Schlieren processes is the investigation of flow problems of many kinds of gases within the subsonic and supersonic ranges. In all such cases, where a high accuracy and a high sensitivity of the process is desired the medium to be investigated is installed within a bundle of parallel light rays forming a collimated beam of light.

A simple arrangement consists of a concentrated light source having an optical slit located on the focal plane of a good lens to obtain a good parallel bundle of light rays. The investigated medium is placed in this collimated light beam, with a similar second lens provided for receiving the collimated light bundle and passing the light rays through the focal point of the second lens, with a one sided sharp straight edge or Schlieren knife edge engaging the side of the concentrated bundle of light rays at the second lens focal point to produce a darkened light field, a lens and viewing screen preferably being provided just beyond the Schlieren knife to provide a viewing, or photographic screen for receiving the Schlieren image of the test material and its surrounding area when the test material is inserted in the collimated light beam between the first and second mentioned lens. When the Schlieren knife engages the edge of the concentrated light beam at the second focal point to a slightly greater degree the Schlieren image field darkens uniformly. Only lens systems which are optically good and very well corrected can be used, also the glass of the lens must be free from striae and air bubbles. A long focus lens is also conventionally chosen in order to obtain good sensitivity, and only telescope lenses for astronomical purposes with long focal lengths will fulfill the above conditions, such lenses being however, very difficult to make, and very expensive.

Since larger observation fields are desired, which require large lenses, which are more difficult to make because of some of the errors and imperfections in large solid lenses, some of these errors can be eliminated by the use of accurate concave reflectors or mirrors, which are easier and less expensive to manufacture especially in larger sizes, than the usual solid lenses.

In a well known publication by H. Schardin, Das Toeplersche Schlieren-Verfahren, Ver. Deutsch. Ing. Forschungsheft, 367 (July-August) 1934 and other publications, it is shown that the best and most compact Schlieren arrangement is a Z shaped one, using concave mirrors to produce an approximately parallel light bundle. The axes of the mirrors are turned slightly so that the light entrance and exit points are offset or outside of the parallel light bundle. A long focal length however is required with this Z system in order to obtain as good sensitivity as possible, and this results in a smaller "light aperture" and corresponding low illumination. Another disadvantage of this and all nonsymmetrical arrangement in general is astigmatism, caused by the rays of light between the entrance and exit points and the two mirrors being oblique.

In the present invention I utilize a symmetrical optical system for the Schlieren apparatus in which the reflector at the light entrance end can be of shorter focal length and thus provide a larger "light aperture." By disposing the optical axes of two concave parabolic reflectors in coincident relation, with their focal points extending toward each other in spaced relation, and introducing the light beam transversely to the focal axis, at the focal point, by means of a conventional optical light slit and condensing lenses, and then reflecting the light along the optical axis by means of a very small flat reflector or mirror I am able to obtain good uniform illumination. The size of the flat reflector is maintained very small and located at the center of the collimated light rays, between the two reflectors. The Schlieren material which is introduced between the focal points of the reflectors is usually of a solid or opaque type and occupies a space somewhat larger than the shadow of the mirror, and therefore the small shadow of the mirror in the light bundle is not objectionable since it usually is covered by the outline of the test material. By using a very small reflector of heat resisting material such as quartz the heat from the light concentrated on the small mirror at the focal point of the first concave reflector is not objectionable The second concave reflector is also preferably provided with a similar very small reflector inclined across its focal point for reflecting the light bundle from the concave reflector out of the collimated rays between the two concave reflectors, with the Schlieren head located preferably at the last mentioned focal point to provide the darkened field and Schlieren image on a screen which is provided for that purpose.

As a slight modification, the small flat reflectors may be of the inclined partially transparent flat plate type, located slightly out of focal points of the concave reflectors or inclined through the focal points of the two concave reflectors so as to provide means for introducing the concentrated light into the collimated beam and reflecting the light laterally out of the collimated light bundle between the concave reflectors. This arrangement provides means for reducing or eliminating the shadow of a small reflecting surface located in the bundle of collimated light rays.

In the above arrangements means are also provided for changing the contour of the concave reflecting surfaces of the concave reflectors to bring all parallel or collimated light rays reaching the reflectors to a precise focal point of minimum size, even when spherical mirrors are used. I propose also to utilize a Z shape arrangement in combination with the means for changing the contour of the reflectors so that the curved reflecting surfaces can be changed to bring all parallel rays to a precise common focal point.

Other objects and advantages of my invention will become apparent from the following description taken in connection with the accompanying drawings in which like reference characters refer to like parts in the several figures.

Fig. 1 is a somewhat diagrammatic sectional view taken through a preferred form of my invention;

Fig. 2 is a view similar to Fig. 1, but showing a slightly modified arrangement;

Fig. 3 illustrates a further modified embodiment in which the light entrance arrangement is full symmetrical and the light exit arrangement is geometrically nonsymmetrical but optically corrected; and Fig. 4 is a still further modified arrangement utilizing a nonsymmetrical Z shaped Schlieren apparatus including means for adjusting and regulating the contour of the concave reflectors to provide the optical precision of a full symmetrical system.

Referring more particularly to Fig. 1 of the drawings the concentrated light source is indicated at 1. The light passing through a light aperture or optical light slit 2 strikes a pair of condensing lenses 3 which concentrate the light onto a small inclined flat reflector 4 to form an image of the light slit source at the focal point of a concave reflector 5. The reflector 5 is carried by a supporting plate 6, having a plurality of adjusting screws 7 extending therethrough for regulating curvature of the concave reflector. The reflector 4 is located at the point where the light is concentrated and is preferably supported by a transparent plate or by another support 8, on a quartz or heat insulating rod 9. The light is thus introduced at the focal point of the concave reflector 5 at right angles to the axis of the reflector 5 and is reflected by the reflector 5 in collimated relation past the small reflector 4 and through the transparent supporting plate 8 to a second concave reflector 10 which is carried by a flanged supporting plate 11, also having adjusting screws 12 therethrough to vary the curvature of the concave reflector 10.

If an approximated point shaped light source is available, the concave reflector 5 can have a short focus, providing a large light aperture while the concave reflector 10 has a comparatively long focus to provide better image definition. A second transparent supporting plate or any other support 13 is provided having an inclined reflecting surface or mirror 14 carried thereon for reflecting the reflected light beam from the reflector 10 at its focal point 16 laterally out of the collimated light beam 15. The edge of the small inclined reflector member 14 constitutes a Schlieren knife edge 16, engaging the reflected beam 17 at its focal point to produce a Schlieren image on a screen 18 located within a receptacle or box 19, having a lens 20 through which the reflected beam passes.

The Schlieren test medium is located at 20a between the focal points of the reflectors 5 and 10, substantially on the coincident axes of the reflectors 5 and 10 so that the general outline of the test medium covers the shadows in the collimated light beam formed by the small reflectors 4 and 14. When the support 13 is shifted axially to cause the edge portion of the small reflector 14 to touch or engage the reflected beam 17 at its focal point a darkened field is produced on the screen 18 which clearly produces a Schlieren picture of the test medium and its surrounding area on the screen. The reflecting surfaces of the two concave mirrors 5 and 10 are capable of being locally deformed by the screws 12 so that the best optical reflecting surface correction can be obtained, which is necessary for the high sensitivity of the Schlieren process.

Since the small reflector 4 receives the concentrated image of the light source, it can necessarily be very small, only of sufficient size to surround the light beam at the focal point. Since the light is concentrated on this reflector the temperature may run high and for this reason the reflector is spaced from the transparent supporting plate and supported on a quartz or insulating rod 9. The reflector 4 is provided with an optically flat inclined surface located in substantially a forty-five degree inclination relation to the axis of the reflector 5, and it may comprise an inclined, ground, and polished surface formed on the end of the quartz rod 9.

Referring now to Fig. 2, the concentrated light source is indicated at 21, an optical light slit or aperture 22 being provided in front of the light source to permit the concentrated light from the light source to pass through the light aperture or slit to the two condensing lenses 23 where it is concentrated at 24 on the inclined surface of a small reflector member 25 similar to the reflector 4 in Fig. 1. This small reflector 25 is supported on an insulating or quartz rod 26 carried by the center of a transparent supporting plate or any other support 27 located on the axis of the concave reflector 28. The concave reflector 28 has its focal point located in the plane of the small mirror 25 so that the concentrated beam of light from the light source will be reflected to the reflecting surface of the concave mirror 28, and then reflected as a collimated light beam 29 through the transparent supporting plate 27 and past the Schlieren test medium 30. A second concave reflector 31 is located in the collimated beam 29 with its axis coincident to the axis of the reflector 28 for reflecting the collimated beam back toward the reflector 28 in a converging light beam. Inclined across the collimated beam 29 and the beam 32 reflected by the reflector 31 and located between the reflector 31 and its focal point is inclined transparent supporting plate 33 having a partially silvered reflecting surface 34 of sufficient area to surround the reflected beam 32 and reflect the same laterally out of the collimated beam 29. In this form of the invention the focal point of the reflector 31 is located at 35 in a laterally disposed relation to the coincident axes of the two reflectors 28 and 31, and the Schlieren knife edge 36 engages the reflected beam 32 at its focal point 35 to produce a Schlieren image on the screen 37 which is located within a casing or box 38 having a lens 39 for the concentrated beam to pass through and focus the same on the screen.

Adjusting screws 40 and 41 are provided, threaded through the supporting plates 42 and 43 for moving local areas of the reflectors, for making fine adjustments to the concave reflectors 31 and 28 so as to concentrate the collimated light beam to a precise focal point, so as to produce a clear Schlieren image at the viewing screen 37.

The optical system just described has the advantage that the entire system is symmetrical and therefore free of astigmatic errors. If a point shaped light source is used, the aperture of the mirror 5 or the mirror 28 can therefore be made much larger than in a system of the so-called Z type of Schlieren apparatus in which both large reflectors are inclined and the light source is located at one side of the collimated beam between the reflectors while the Schlieren head is at the opposite side. A reduction in the focal length of the first concave mirror to about a third of that used in the Z shaped interferometer apparatus increases the light power to about a ten time value. The shadow of the small mirror 4 does not produce a disturbance in the Schlieren picture although the shadow can be seen at the center of the interference picture as a shadow. The sharpness of the shadows caused by the small mirrors 4 and 14 depends upon their distance from the position of the medium 30 to be investigated to which the camera or viewing screen is adjusted. Because in many cases of investigation the center of the picture is filled with an opaque medium to be investigated which is larger than the small mirror, there is no disturbance. If it is desired to substantially eliminate the shadow of the mirrors in the collimated beam a second plate similar to the plate 33 in Fig. 2 may be utilized with a small semi-silvered center portion for reflecting the beam from the condensing lenses 23 onto the concave reflector 28. This semi-transparent mirror would preferably be disposed in a forty-five degree inclined relation across the collimated beam, and somewhat out of the focal point of the reflector 28 so as to reduce the heat concentration. In using a semi-silvered mirror the best light efficiency would be about fifty per cent for reflection and fifty per cent for transmission. This optically good arrangement has to be paid for by a light loss of seventy-five per cent since only twenty-five per cent of the whole light is available for optical purposes. If, for example, ten times the light power is gained by the new light inlet arrangement, as shown in Figs. 1 and 2, then 2.5 times as much light is available in spite of the light loss compared with the former Z shaped Schlieren arrangement. As before mentioned the main disadvantage of the Z shaped system is the fact that the concave mirrors ordinarily will not bring the light rays in transverse planes on an inclined axis to a precise focal point, or in other words the astigmatism which is caused by this optical arrangement.

Another advantage of the system, as shown in Fig. 2, is that simultaneously with the Schlieren picture on the screen 37 a full shadowgraph picture can be taken on the screen 33a, or by a camera by using the reflected part 33b of the light, leaving the partially coated plate 33.

Figs. 3 and 4 show respectively a partially and full Z shaped optical arrangement in which it is possible to adjust or distort the concave reflectors so as to bring the reflected light rays into a precise focal point in both transverse planes. In Fig. 3 the concentrated light source is indicated at 44 and passes through the light slit aperture 45, the condenser lenses 46 passing the small image of the light slit through the focal point 47 on the axis of the concave mirror 48, at the focal point of that mirror. An inclined small flat reflector 49 is inclined across the focal point of the concave mirror 48 to reflect the light to the concave reflector 48 so that the light will be reflected in collimated relation as the beam 50 to the reflecting surface of the second concave reflector 51 inclined with respect to the axis of the reflector 41 and the collimated beam 50. The small reflecting plate 49 is preferably carried by a heat insulating supporting rod 52 located at the center of a transparent supporting plate or any other support 53 disposed across the collimated beam 50. Adjusting screws 54 are provided in the supporting plate 55 engaging the rear of the reflector 48 for making fine local adjustments of the reflecting surface or contour of the concave reflector 48 so as to concentrate the reflected beam 50 onto the reflecting surface of the reflector 51 in precise collimated relation. The reflector 51 is also carried by a supporting plate 56 having adjusting screws 57 therethrough in engagement with the rear of the reflector 51 for adjusting the contour of the reflecting surface of the reflector 51 to bring all of the rays of the collimated light beam 50 reflected thereby, out of the collimated beam 50 and to a common precise focal point 59 where the Schlieren knife edge 59 is located. A receptacle or box 60 is provided having a lens 61 and Schlieren image recording screen 62 for recording Schlieren image of a Schlieren test medium 63 located in the collimated light beam 50. Fig. 4 discloses a true Z shaped Schlieren optical apparatus in which the concentrated light source indicated at 64 passes through the optical light slit 65 and is concentrated by the condensing lenses 66 through an aperture 71a onto the inclined concave reflecting surface of the mirror 68 supported in a supporting plate 69. The reflecting surface contour of the reflector 68 is adjustable by the adjusting screws 70. By adjustment of the screws 70 the collimated light beam can be made precisely parallel. The problem of astigmatism in the Z type system can thus be corrected by this adjustment of the contour of the mirror 68 through the adjusting screws 70. The second concave mirror which receives the collimated beam 71, in Fig. 4, is similar to the mirror 56 in Fig. 3. The mirror is indicated at 72 and is carried by the flange supporting plate 73 having the adjusting screws 74 extending through the back into adjusting contact with the rear face of the mirror 72 so that upon proper adjustment of these screws the reflecting surface of the concave reflector is changed locally in contour so that the reflected collimated beam can be brought to a precise focus at the point 72a where the Schlieren knife edge 75 is located, a receptacle or camera 76 being provided having a lens 77 and viewing photographic screen 78 for recording the Schlieren image of the Schlieren test medium 79, located in the collimated light beam 71.

What I claim is:

1. In an improved Schlieren apparatus; a pair of parabolic reflectors directly facing each other with their optical axes in alignment and their focal points spaced apart on the coincident optical axes to receive a Schlieren test medium therebetween, a first one of said reflectors having a shorter focal length than the second one of the reflectors; a light source located at one side of the reflected light field between the two reflectors in a transverse plane through the focal point of the first reflector, including a light slit aperture and lens means for concentrating light passing said aperture through the focal point of said first reflector; a small plane mirror inclined across the optical axes through said first reflector focal point having a restricted reflecting area sufficient to encircle the concentrated light from the light source at that focal point for reflecting the light to the said first reflector to produce a collimated light beam, reflected by the first reflector past the small mirror and through the Schlieren medium receiving space, to the second reflector; supporting means extending transversely across the center of the collimated beam in axially spaced relation to said first reflector focal point, between that focal point and the focal point of the second reflector; a first mirror supporting rod extending axially on the optical axis of the first reflector from said supporting means and connected at its end to the small mirror for rigidly supporting the same in fixed relation to the first reflector; a second small mirror supporting means extending transversely across the collimated beam adjacent the focal point of the second reflector between the second reflector's focal point and the first small mirror support; a second small plane mirror rigidly carried by the second small mirror supporting means in an inclined plane through the focal point of the second reflector, said second small mirror having a restricted reflecting area sufficient to encircle the second mirror focal point, and having one edge disposed to engage the side of the reflected beam from the second reflector at its focal point to produce a darkened light field in the light beam reflected by the said second mirror beyond said second reflector focal point to thereby produce a Schlieren image on an image receiving screen placed in the darkened light field reflected by said second mirror, of a test medium when placed in the collimated beam, between the focal points of said reflectors.

2. In a Schlieren apparatus, a pair of parabolic reflectors facing each other with their optical axes in alignment, and their focal points on said axes in axially spaced relation to each other to provide a Schlieren test medium receiving space between said focal points; a light source; means for projecting a beam of light from the light source through the focal point of a first one of the reflectors to illuminate the same to produce a reflected collimated light beam from said first reflector through the Schlieren test medium receiving space to the second reflector; a mirror inclined across the axis of the collimated light beam through the focal point of the second reflector, having a small plane reflecting surface sufficient to enclose the reflected beam from the second reflector at its focal point, said mirror reflecting surface having one edge thereof touching the last mentioned reflected beam at said last focal point to produce a darkened light field in the reflected beam from the second reflector beyond the focal point of said second reflector; and a Schlieren image receiving screen positioned across said last mentioned reflected beam for receiving said Schlieren image.

3. Apparatus as claimed in claim 2 in which supporting means for the last mentioned mirror is provided comprising a rigid support extending transversely across the center of the collimated beam intermediate the second reflector focal point and the first reflector focal point with said small mirror rigidly carried on said support at the center of the collimated beam.

4. Apparatus as claimed in claim 3, in which the supporting means for the said last mentioned mirror comprises a transparent flat plate extending transversely across the collimated light beam from the first reflector to the second reflector, and the said last mentioned mirror is substantially rectangular and inclined to the axis of the collimated beam, extending through the second reflector focal point at substantially 45°, to reflect the reflected beam from the second reflector focal point, laterally out of the collimated light beam, said second mirror being rigidly supported on the transparent supporting plate at the center thereof between the plate and the second reflector with one edge thereof touching the reflected beam from the second reflector at its focal point, to produce a Schlieren beam from the second reflector, reflected by the second mirror at the second reflector focal point; a Schlieren image receiving screen interposed across said Schlieren beam perpendicular thereto at one side of the collimated beam for receiving a Schlieren image of a test medium when interposed in the test medium receiving space with the shadows formed by said mirrors located in the center of the collimated beam within the shadow outline of the Schlieren test medium when interposed in the test medium receiving space.

5. In a Schlieren apparatus; a concentrated light source; a light slit aperture and lens means for producing a converging light beam through a focal point; a pair of parabolic reflectors facing each other in axially spaced relation in optical alignment with their respective focal points disposed in spaced relation to each other to provide a Schlieren test medium receiving space between said focal points; a first one of said reflectors having a shorter focal length than the second one of the reflectors with their optical axes intersecting the converging light beam in perpendicular relation at said first reflector focal point; a transparent flat plate support extending across said axes in spaced relation to the first mirror focal point and between said focal points; a rigid supporting rod fixed at one end to said transparent plate at the center thereof and extending along said axes toward the focal point of said first reflector; a first small mirror rigidly carried by the said other end of said supporting rod, having a plane reflecting surface inclined across said first reflector focal point at 45° to produce a reflected expanding beam illuminating the first reflector to provide a reflected collimated light beam from the first reflector to the second reflector, to be reflected by the second reflector through its focal point to form an expanding light beam; a second transparent flat plate interposed across the collimated beam intermediate the second reflector focal point and the Schlieren test medium receiving space; a second small mirror carried by said second transparent plate having a reflecting surface inclined through the second reflector focal point at substantially 45° to reflect the light from the second reflector, laterally out of the collimated beam through the second reflector focal point, said second mirror reflecting surface being sufficient to enclose the second reflector focal point with one edge of the enclosing reflecting surface touching one side of the concentrated light beam at the second reflector focal point to produce a darkened reflected light field beyond said second reflector focal point, and a Schlieren image receiving screen interposed in the darkened light field in the path of the expanding beam reflected by the second mirror, and located at one side of the collimated beam, for receiving a Schlieren image produced in the darkened light field, when a Schlieren test medium is interposed in the said Schlieren test medium receiving space.

THEODOR W. ZOBEL.

References Cited in the file of this patent

UNITED STATES PATENTS

| Number | Name | Date |
|---|---|---|
| 1,698,905 | Beechlyn | Jan. 15, 1929 |
| 1,794,103 | Cubitt | Feb. 24, 1931 |
| 1,915,204 | Scheibli et al. | June 20, 1933 |
| 1,963,128 | Geister | June 19, 1934 |
| 1,969,037 | Rieber | Aug. 7, 1934 |
| 2,081,299 | Hill | May 25, 1937 |
| 2,312,888 | Everest | Mar. 2, 1943 |
| 2,362,235 | Barnes | Nov. 7, 1944 |
| 2,425,758 | Saunders | Aug. 19, 1947 |
| 2,541,437 | Prescott | Feb. 13, 1951 |

FOREIGN PATENTS

| Number | Country | Date |
|---|---|---|
| 400,445 | Great Britain | Oct. 26, 1933 |
| 888,644 | France | Sept. 13, 1943 |

OTHER REFERENCES

Keagy et al. "Application of the Schlieren Method to the Quantitative Measurement of Mixing Gases in Jets"—pages 667 to 674 of Third Symposium on Combination and Flame Explosion Phenomena, 1949—Williams and Wilkins Co.—Baltimore, Md. Copy in Patent Office Library.